United States Patent
Plank, Jr.

[11] Patent Number: 5,523,653
[45] Date of Patent: Jun. 4, 1996

[54] LIGHTING APPARATUS WITH IMPROVED CURRENT OVERLOAD PROTECTION CIRCUIT

[75] Inventor: Gerard M. Plank, Jr., Smithtown, N.Y.

[73] Assignee: Tivoli Industries, Inc., Santa Ana, Calif.

[21] Appl. No.: 386,640

[22] Filed: Feb. 10, 1995

[51] Int. Cl.$^6$ .................................................. H05B 37/00
[52] U.S. Cl. ............................................. 315/119; 315/127
[58] Field of Search .............................. 315/119, 90, 127, 315/91

[56] References Cited

U.S. PATENT DOCUMENTS

| | | | |
|---|---|---|---|
| 2,309,711 | 2/1943 | Pearson | 315/127 |
| 5,241,242 | 8/1993 | Daub | 315/127 |
| 5,363,018 | 11/1994 | Shackle | 315/127 |

Primary Examiner—Frank Gonzalez
Assistant Examiner—Reginald A. Ratliff
Attorney, Agent, or Firm—Price, Gess & Ubell

[57] ABSTRACT

A low voltage lighting fixture connected to an isolation step-down transformer is protected from limited or maximum short circuit conditions by monitoring the secondary current of the step-down transformer until a fault is detected, whereupon the protection circuitry deenergizes the primary of the transformer by opening a relay. The protection circuitry is completely isolated such that a breakdown in voltage from the primary to secondary of the stepdown transformer, which would place 120 volts on the secondary side, cannot occur. Additionally, while monitoring the high current-low voltage secondary of the transformer, the relay is placed in the primary circuitry which is at line voltage, but at a much lower current rating. The relay is a normally open device which closes when either of a pair of redundant optoisolators conduct current.

30 Claims, 2 Drawing Sheets

તે5,523,653

LIGHTING APPARATUS WITH IMPROVED CURRENT OVERLOAD PROTECTION CIRCUIT

BACKGROUND OF THE INVENTION

1. Field of the Invention

The subject invention relates to lighting apparatus and, more particularly, to low voltage lighting apparatus employing economical, effective, and affordable circuit overload protection.

2. Description of Related Art

Relatively recently, novel low voltage lighting applications have become popular. Certain such applications have involved so-called "open wire" low voltage systems wherein lighting fixtures are connected to bare conductors hung from ceilings of various establishments. Such applications typically require some sort of circuit protection, which has in the past involved large, cumbersome, and expensive circuitry. Such circuitry has, in fact, been so expensive that it roughly doubles the cost of the systems such that such systems have largely been limited to "high end" environments." The circuitry is further typically limited in application to specific currents and voltages available and may not be readily usable, for example, in Europe, where different line voltages and frequencies are available.

SUMMARY OF THE INVENTION

According to the invention, low voltage lighting apparatus is provided which employs novel current protection apparatus. The current protection apparatus samples the load current and responds to a surge or instantaneous overcurrent condition in load current to disable the primary current supplied to an isolation transformer.

Circuitry according to the invention features the advantage that it can be implemented inexpensively in a solid-state U.L.-approved circuit and can operate with various line voltages and frequencies. The circuit can respond to an overcurrent condition ranging from a severe short circuit to a limited 30 AWG wire short circuit such that the device being protected will automatically be disconnected from the power source during a wide range of possible short circuit conditions.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an illustrative embodiment of overcurrent protected low voltage lighting apparatus.

Figure 1:
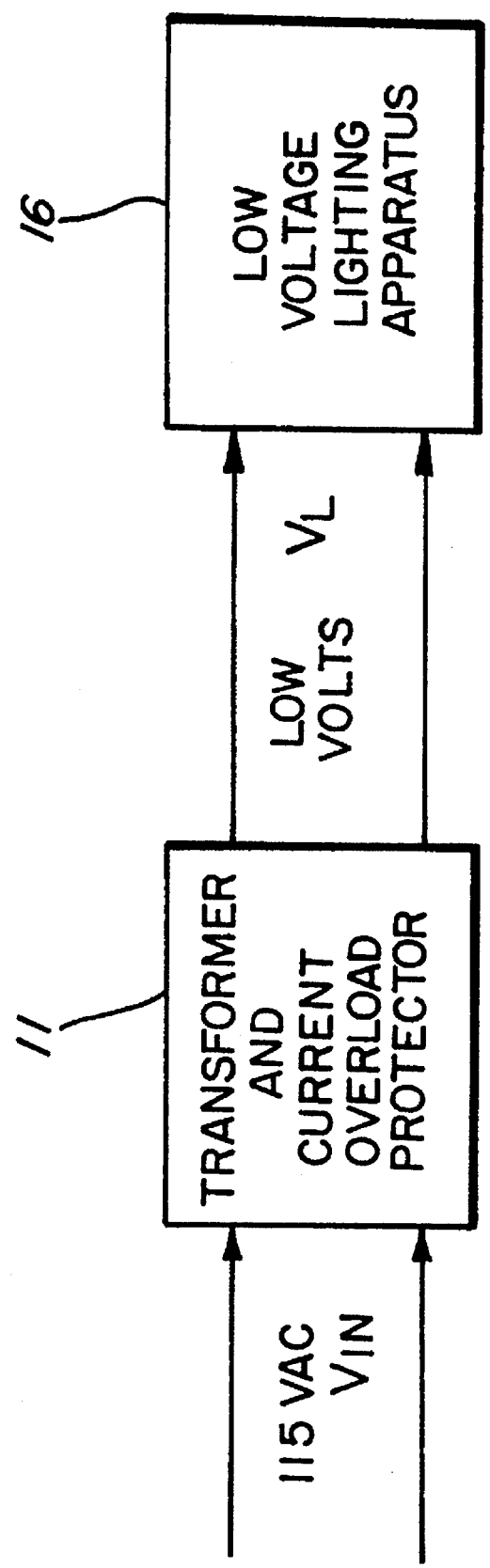
FIG. 1 is a schematic diagram illustrating lighting apparatus according to the preferred embodiment.
Figure 2:
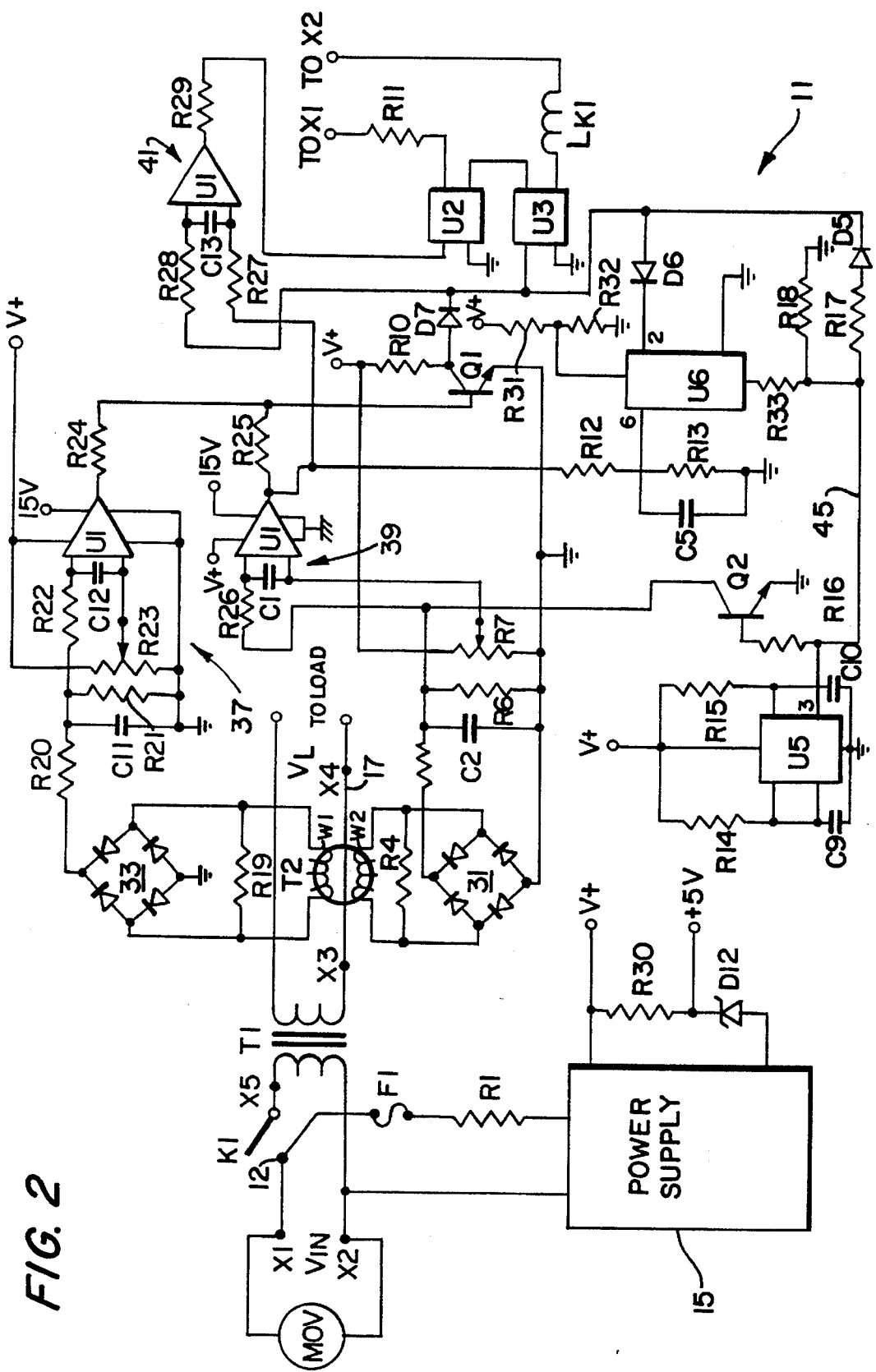
FIG. 2 is an electrical circuit diagram of a current overload protection circuit according to the preferred embodiment.

The preferred embodiment is shown in FIGS. 1 and 2. FIG. 1 illustrates transformer and protection circuitry 11 connected between a high voltage power source $V_{IN}$ and supplying a low voltage $V_L$, e.g., in the range 1 to 30 volts to a low voltage lighting apparatus, which may be any one of a number of low voltage lighting configurations. As shown in FIG. 2, the line input voltage $V_{IN}$ has a metal oxide varistor (MOV) connected thereacross, as well as the primary winding of an isolation transformer T1. The transformer T1 is connected to the line power when a normally open relay switch K1 is closed. The line input voltage may be 115 volts or 230 volts at 50 or 60 Hz. The transformer T1 may be any U.L.-listed step-down, isolation transformer from 0 to 750 VA rating. Higher VA ratings and various input voltages can be accommodated by circuits constructed according to the invention.

The input voltage $V_{IN}$ is connected at a terminal 12 through a fuse F1 and resistor R1 to an internal power supply 15 which converts the 115-volt AC power to DC source voltages V+ and +5 volts, those voltages appearing at the respective terminals of a resistor R30 connected to a zener diode D12. The power supply 15 may employ a conventional power supply chip such as a 50 milliamp power supply, Catalog No. MOC3010, to provide two output voltages $V^+$ and +5 volts. The varistor MOV protects the power supply 15 from line transients which can "blow" the power supply 15.

The secondary winding of the: transformer T1 supplies a low voltage AC output $V_L$ to a load such as a low voltage lighting circuit. The voltage $V_L$ may range, for example, from 0 volts to 24 volts and may, in fact, be any desired voltage in various embodiments.

As further shown in FIG. 2, one of the secondary leads 17 from the transformer T1 passes through a toroidal transformer T2. The toroidal transformer T2 has first and second windings W1, W2, preferably of equal turns, each of which develops a small current sample proportional in all respects to the current being drawn by the load connected across $V_L$. The respective signals developed by the first and second windings W1, W2 are converted to DC voltages by respective conversion circuits 31, 33 shown as full wave rectifiers or bridge circuits in the illustrative embodiment.

The DC outputs of the respective full wave rectifier bridge circuits 31, 33 are supplied to respective comparator circuits 37, 39 which provide isolation and detect an instantaneous surge in current by comparing the DC voltage on one input to a reference voltage on a second input. The reference voltage for the first comparator circuit is set by variable resistor R23, while the reference voltage for the second comparator is set by variable resistor R7. The comparators U1 of the comparator circuits 37, 39 may employ, for example, Part No. HA490505 as manufactured by Harris Semiconductor.

Each of the comparator circuits outputs to the base of a transistor Q1, whose collector is connected to the input of a triac optoisolator U3. The optoisolators U2, U3 serve to isolate the output of the protection circuit from feedback into it from the high power primary side X1, X2.

As may be appreciated, the provision of two comparator circuits 37, 39 provides circuit redundancy and thus ensures that the circuit will continue to function in the event that one of the comparator circuits should fail. In normal operation, an output from either comparator circuit 37, 39 is inverted by a transistor Q1 and causes the second triac optoisolator U3 to shut off. The flow of current through the relay coil LK1 is thereby stopped, causing the relay contacts K1 to open, thereby interrupting the flow of primary current through the primary transformer T1. In this manner, the low voltage load is protected from surges.

The circuitry thus far discussed may be further configured to accommodate initial "power-up" without falsely triggering. Accordingly, circuitry including a timer chip U5, a dual D-type flip-flop U6, a third comparator circuit 41, and a second transistor Q2 are provided. The timer chip U5 may be a 555 timer and the flip-flop U6 a Part No. 4013 as manufactured by National Semiconductor. Upon initial power-up, the timer U5 times an interval during which the voltage outputs of the power supply are allowed to settle. In particular, the output of the flip-flop chip U6 at pin 2 must be high in order for the optoisolator U3 to conduct. During the initial start-up phase, the timer chip U5 guarantees that its output pin 3 to the flip-flop U6 will remain high by conducting for the first few hundred milliseconds through the diode D5. The output pin 3 is zero after these first few hundred milliseconds. The RC network C5 and R13 holds pin 6 of the flip-flop chip U6 low until the circuit is set.

The second transistor Q2 conducts when the timer U5 is initially turned on for a few hundred milliseconds until the timer U5 stops conducting through the diode D5, at which point the transistor Q2 stops conducting. The second transistor Q2 thus conducts during start-up in order to take up any initial power surges.

The output of the comparator 41 must remain high in order for the optoisolator U2 to conduct. In the event that the comparators 37 and 39 sense a spike of current, the optoisolator U3 will be turned off, at which point the comparator U41 will keep the optoisolator U2 off until the circuit is reenergized and the fault cleared. Accordingly, the comparator chip U41 is used to keep the circuit off after a fault has been determined by having its output remain low. The initial start-up phase is determined by the timer U5 as described above.

In summary, the current overload protection circuit is a solid-state product which accurately senses the current flow into the low voltage lighting apparatus and shuts down the current source when an instantaneous overcurrent condition is detected. The overcurrent condition can be from a severe short circuit to a limited 30 AWG wire short circuit such that the device being protected will automatically be disconnected from the power source during a wide range of possible short circuit conditions in the field.

The current overload protection circuit incorporates an internal power supply 15 which can operate at 115 to 230 volts at 50 or 60 Hz. The output $V_L$ of the isolation step-down transformer T1 can be dimmed without detrimental effects to the overload protection circuit. The circuit board, including components, can be mounted in a small canopy which measures 4 in.×4 in.×1 in. (10.2 cm.×10.2 cm.×2.5 cm). The device, as manufactured, can be used in circuits up to 500 Va utilizing a standard isolation step-down transformer that is U.L.-listed.

Thus, in the preferred embodiment, a low voltage lighting fixture 16 connected to an isolation step-down transformer T1 is protected from limited or maximum short circuit conditions by monitoring the secondary current of the step-down transformer T1 until a fault is detected, whereupon the protection circuitry deenergizes the primary of the transformer T1 by opening the relay K1. The protection circuitry is completely isolated such that a breakdown in voltage from the primary to secondary of the step-down transformer T1, which would place 120 volts on the secondary side, cannot occur. Additionally, while monitoring the high current-low voltage secondary of the transformer T1, the relay K1 is placed in the primary circuitry which is at line voltage, but at a much lower current rating. The relay K1 is a normally open device which closes when either of the pair of redundant optoisolators U2, U3 conduct current in response to the control circuitry. Redundant optoisolator triacs are used to ensure diversity in circuitry in addition to isolating the control circuit components.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. Lighting apparatus comprising:

a low voltage lighting apparatus means for providing illumination in response to application of a low voltage thereto;

transforming means supplied with a primary line voltage and a primary current for transforming said line voltage to said low voltage and a secondary current; and circuit protection means for monitoring said secondary current, for detecting an instantaneous overcurrent condition in said secondary current, and for interrupting said primary current in response to detection of said overcurrent condition.

2. The lighting apparatus of claim 1 wherein said low voltage is an A-C voltage in the range of 1 to 30 volts.

3. The lighting apparatus of claim 2 wherein said transforming means comprises a transformer having a primary side including a primary winding supplied with said primary line voltage and through which said primary current flows, and further having a secondary winding providing said low voltage and secondary current, and wherein said circuit protection means includes a relay means disposed in series with said primary winding for interrupting said primary current.

4. The lighting apparatus of claim 3 wherein said relay means comprises:

a relay having a coil and a contact means, said contact means being responsive to current flow through said coil to close and conduct said primary current and responsive to termination of said current flow to open and cease conducting said primary current; and further including switching means in said circuit protection means responsive to application of said primary voltage to cause current flow through said coil and responsive to said overcurrent condition to terminate said current flow, thereby opening said contact means and terminating flow of said primary current.

5. The lighting apparatus of claim 4 wherein said switching means includes first and second serially-connected optoisolators.

6. The lighting apparatus of claim 5 wherein said switching means further includes means for holding one of said optoisolators off, thereby holding said contact means open until a fault which has caused a said overcurrent condition is eliminated.

7. The lighting apparatus of claim 6 wherein said switching means further includes comparator means for detecting a said overcurrent condition and turning off one of said optoisolators.

8. The lighting apparatus of claim 7 wherein said comparator means comprises first and second redundant comparator circuits.

9. The lighting apparatus of claim 7 further including:
  timer means for timing a selected interval at the start-up of operation of said circuit protection means; and
  means responsive to said timer means for generating a signal for holding one of said optoisolators on during said interval.

10. The lighting apparatus of claim 9 wherein said timer means comprises a timer circuit having an output and wherein said means responsive to said timer means is a flip-flop having an output means for receiving a signal from the output of said timer circuit.

11. The lighting apparatus of claim 1 further including:
  timer means for timing a selected interval at the start-up of operation of said circuit protection means for preventing said circuit protection means from falsely interrupting said primary current during said interval.

12. The lighting apparatus of claim 11 wherein said timer means comprises a timer circuit having an output and a flip-flop having an output means for receiving a signal from the output of said timer circuit.

13. The lighting apparatus of claim 4 wherein said switching means includes at least one optoisolator means for terminating said current flow and for isolating said circuit protection means from feedback from the primary side of said transformer.

14. The lighting apparatus of claim 3 further including:
  timer means for timing a selected interval at the start-up of operation of said circuit protection means for preventing said circuit protection means from falsely interrupting said primary current during said interval.

15. The lighting apparatus of claim 3 further including a metal oxide varistor connected across said primary winding.

16. Lighting apparatus comprising:
  a low voltage lighting apparatus means for providing illumination in response to a low A.C. voltage in the range of 1 to 30 volts;
  a transformer having a primary winding supplied with said primary line voltage and through which a primary current flows, and a secondary winding providing said low voltage and a secondary current drawn by said low voltage lighting apparatus;
  means responsive to flow of an activating current therethrough for permitting flow of said primary current and responsive to termination of the flow of said activating current to interrupt said primary current;
  means including at least one triac optoisolator for providing said activating current in response to initial application of power to said transformer and responsive to an output signal for shutting off said activating current, thereby interrupting the flow of said primary current;
  means for developing an A.C. current sample proportional to said secondary current;
  means for converting said current sample to a D.C. voltage; and
  comparator means for comparing said D.C. voltage to a reference voltage and generating said output signal in response to an instantaneous increase in said secondary current.

17. The lighting apparatus of claim 16 wherein said means including at least one triac optoisolator further includes timer means for timing a selected interval at the start-up of operation of said lighting apparatus for preventing said at least one triac optoisolator from falsely interrupting said primary current during said interval.

18. The lighting apparatus of claim 16 further including a metal oxide varistor connected across said primary winding.

19. The lighting apparatus of claim 17 further including a metal oxide varistor connected across said primary winding.

20. The apparatus of claim 16 further including a second optoisolator connected in series with said first optoisolator and further including means for holding said second optoisolator off after interruption of said primary current.

21. The apparatus of claim 16 wherein said means for permitting and interrupting said primary current flow comprises:
  a relay having a coil and a contact means, said contact means being responsive to the flow of said activating current through said coil to close and conduct said primary current and responsive to termination of the flow of said activating current to open and cease conduction of said primary current.

22. The apparatus of claim 16 further including second comparator means responsive to a voltage proportional to said secondary current for generating said output signal.

23. Power supply and circuit protection apparatus for use with a lighting apparatus comprising:
  a transformer having a primary winding supplied with said primary line voltage and through which a primary current flows and a secondary winding providing a secondary voltage and a secondary current for supply to said lighting apparatus;
  means responsive to flow of an activating current therethrough for permitting flow of said primary current and responsive to termination of the flow of said activating current to interrupt said primary current;
  means for providing said activating current in response to initial application of power to said transformer and responsive to an output signal for shutting off said activating current, thereby interrupting the flow of said primary current;
  means for developing an A.C. current sample proportional to said secondary current;
  means for converting said current sample to a D.C. voltage; and
  comparator means for comparing said D.C. voltage to a reference voltage and generating said output signal in response to an instantaneous increase in said secondary current.

24. The lighting apparatus of claim 23 wherein said means for providing said activating current includes at least one optoisolator.

25. The lighting apparatus of claim 24 wherein said means for providing said activating current further includes timer means for timing a selected interval at the start-up of operation of said lighting apparatus for preventing said at least one optoisolator from falsely interrupting said primary current during said interval.

26. The lighting apparatus of claim 23 further including a metal oxide varistor connected across said primary winding.

27. The lighting apparatus of claim 25 further including a metal oxide varistor connected across said primary winding.

28. The apparatus of claim 24 further including a second optoisolator connected in series with said first optoisolator and further including means for holding said second optoisolator off after an interruption of said primary current.

29. The apparatus of claim 23 wherein said means for permitting and interrupting said primary current flow comprises:

a relay having a coil and a contact means, said contact means being responsive to the flow of said activating current through said coil to close and conduct said primary current and responsive to termination of the flow of said activating current to open and cease conduction of said primary current.

30. The apparatus of claim 23 further including second comparator means responsive to a voltage proportional to said secondary current for generating a said output signal.

* * * * *